Dec. 17, 1968  H. F. OHLE  3,416,835
TRUCK BODY CONVERTING APPARATUS
Filed Jan. 17, 1967  3 Sheets-Sheet 1
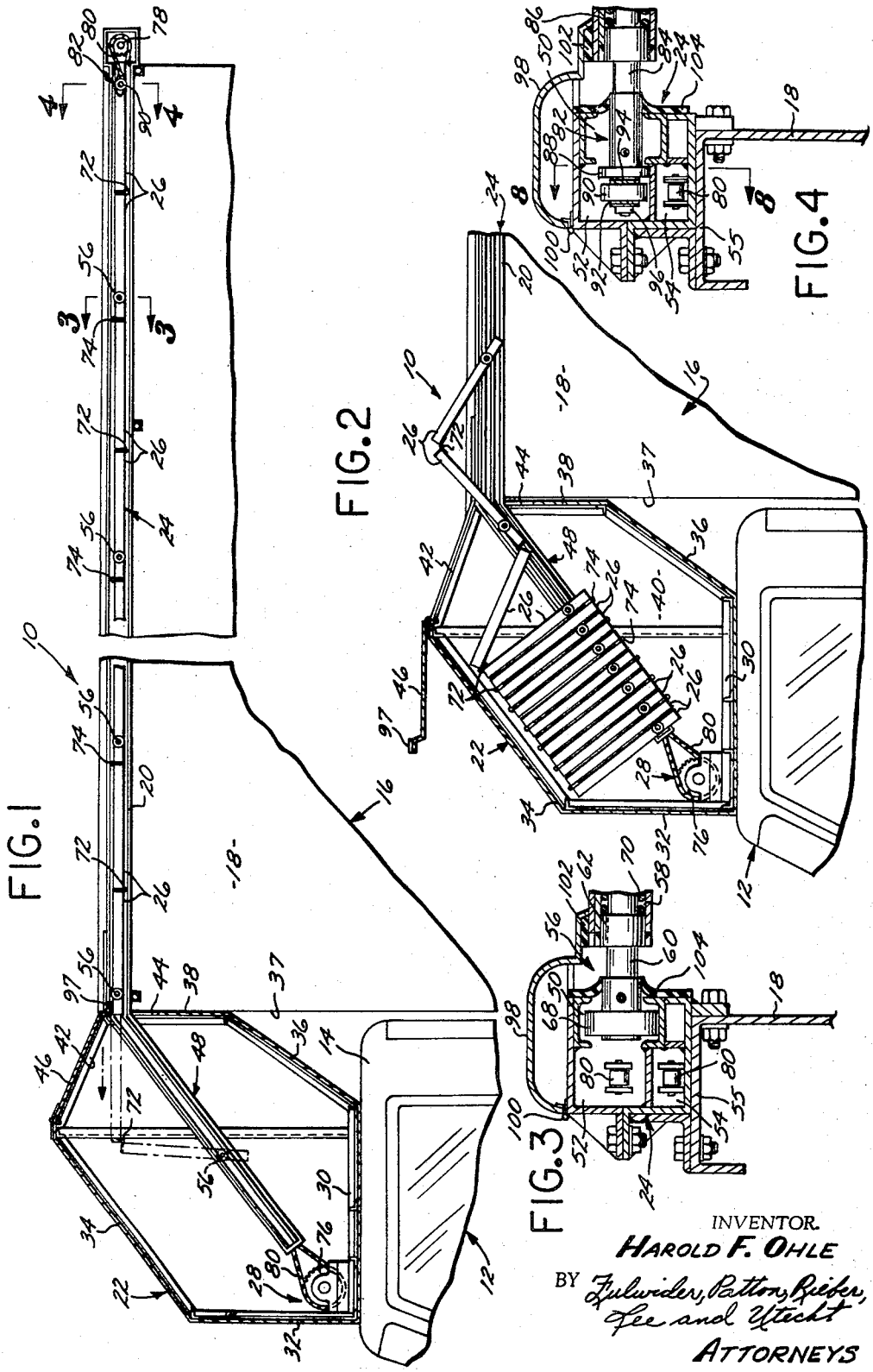
INVENTOR.
HAROLD F. OHLE
BY Fulwider, Patton, Rieber,
Lee and Utecht
ATTORNEYS Dec. 17, 1968  H. F. OHLE  3,416,835
TRUCK BODY CONVERTING APPARATUS
Filed Jan. 17, 1967  3 Sheets-Sheet 2
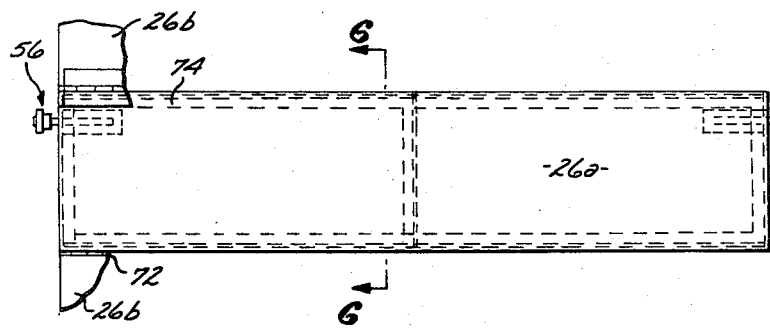
FIG.5
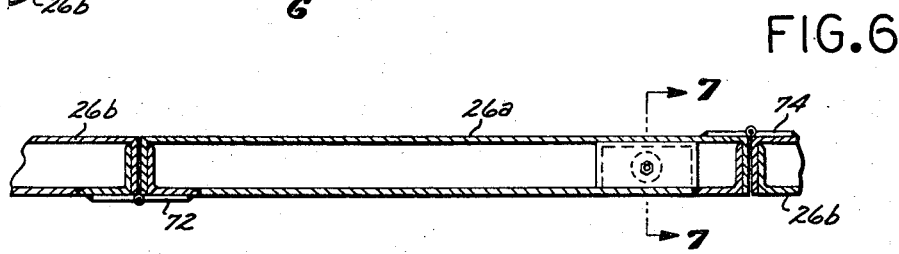
FIG.6
FIG.7
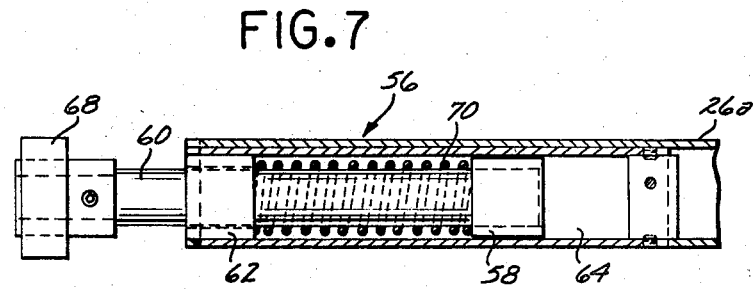
FIG.8
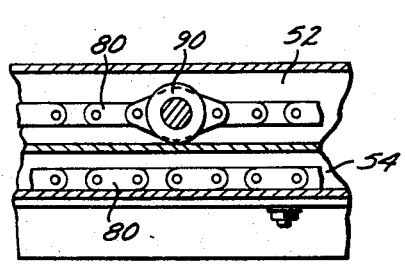
INVENTOR.
HAROLD F. OHLE
BY *Fulwider, Patton, Rieber,*
*Lee and Utecht*
ATTORNEYS Dec. 17, 1968 H. F. OHLE 3,416,835
TRUCK BODY CONVERTING APPARATUS
Filed Jan. 17, 1967 3 Sheets-Sheet 3

INVENTOR.
HAROLD F. OHLE
BY Fulwider, Patton, Rieber,
Lee and Utecht
ATTORNEYS

United States Patent Office 3,416,835
Patented Dec. 17, 1968

3,416,835
TRUCK BODY CONVERTING APPARATUS
Harold F. Ohle, 11949 Lesser St.,
Norwalk, Calif. 90650
Filed Jan. 17, 1967, Ser. No. 609,803
10 Claims. (Cl. 296—100)

ABSTRACT OF THE DISCLOSURE

An apparatus which can be mounted to a truck, and which includes a housing and a plurality of panels slidable in tracks to overlie and cover the body, and retractable for storage in the housing in accordian fashion.

---

The present invention relates to improvements in apparatus for automatically covering the open body of a truck to convert the truck to a covered van.

Motor trucks have many uses and their bodies are usually designed for special performance. For example, trucks with open bodies may perform certain carrying functions while other carrying operations require closed body trucks or covered vans.

In order to avoid the purchase of two trucks for open and closed use, apparatus has been previously proposed for converting open trucks to covered vans. One such apparatus is disclosed in my prior U.S. Patent No. 3,072,432, issued Jan. 8, 1963. As therein described, my prior truck converting device includes a detachable box connected to the body of the truck and housing a pair of tracks. Similar tracks extend along the upper portions of the sides of the truck and are adapted to receive guide rollers connected to a plurality of top panels. The panels are controlled by cables and are adapted to move between an extended position in which they cover the top of the truck and a retracted position wherein the panels lie within the box.

Although my prior truck converting device has proven very satisfactory, the box occupies an appreciable space in the truck body and movement of the panels into and out of the box is relatively slow.

In view of the foregoing, it is a general object of my present invention to provide more efficient, faster and safer apparatus for covering the open top of a truck to convert the truck to a covered van.

Another object of my invention is to provide an improved truck body converting apparatus in which the panels are easier to fold between the extended and retracted positions than in prior apparatus for the same purpose.

A further object of my present invention is to provide truck body converting apparatus which is fully automatic in operation.

Still another object of my present invention is to provide a truck body converting apparatus which is detachable from the truck and which with minor adjustments, may be interchanged between different trucks.

A still further object of my present invention is to provide an improved truck body converting apparatus which when removed from a truck may be compactly crated for shipment or storage as desired.

Still another object of my present invention is to provide an improved truck body converting apparatus which includes a plurality of pairs of hinged panels for folding inwardly against each other between a retracted position within a box detachably mounted at a forward end of the truck body and a flat extended position over the top of the body.

A still further object of my present invention is to provide apparatus of the foregoing character including improved drive means for moving the panels to automatically fold and unfold between the retracted and extended positions which drive means provides faster, safer and more efficient operation than heretofore has been provided.

The foregoing as well as other objects and advantages of my present invention may be more clearly understood by reference to the following detailed description when considered with the drawings which, by way of example only, illustrate forms of truck body converting apparatus including the features of my invention.

In the drawings:

FIGURE 1 is a fragmentary side view of the truck body converting apparatus of my invention partially in section and with a central portion removed for clarity, the panels of the truck body converting apparatus being in a flat, horizontal extended position;

FIGURE 2 is a fragmentary side view partially in section, illustrating the truck body converting apparatus as the panels are folded from the flat extended positions to a folded and retracted position within a box of the apparatus;

FIGURE 3 is a sectional view taken along the line 3—3 in FIGURE 1, illustrating the construction of one of the tracks along the sides of the truck body and the roller unit extending from one of the panels for riding along the track;

FIGURE 4 is a fragmentary sectional view taken along the line 4—4 in FIGURE 1 and also illustrates the inner construction of one of the side tracks as well as the connection of the drive means of the truck converting apparatus to the rearmost panel for moving the panels along the tracks to fold and unfold the panels between the retracted and extended positions;

FIGURE 5 is a fragmentary top view of one of the panels in the truck converting apparatus;

FIGURE 6 is a fragmentary sectional view taken along the line 6—6 in FIGURE 5 illustrating the inner construction of one of the panels;

FIGURE 7 is a fragmentary sectional view taken along the line 7—7 in FIGURE 6 illustrating the inner construction of the mounting of the rollers connected to the panels;

FIGURE 8 is a fragmentary sectional view taken along the line 8—8 in FIGURE 4 illustrating the connection of a drive chain to the rearmost panel;

Figure 9:
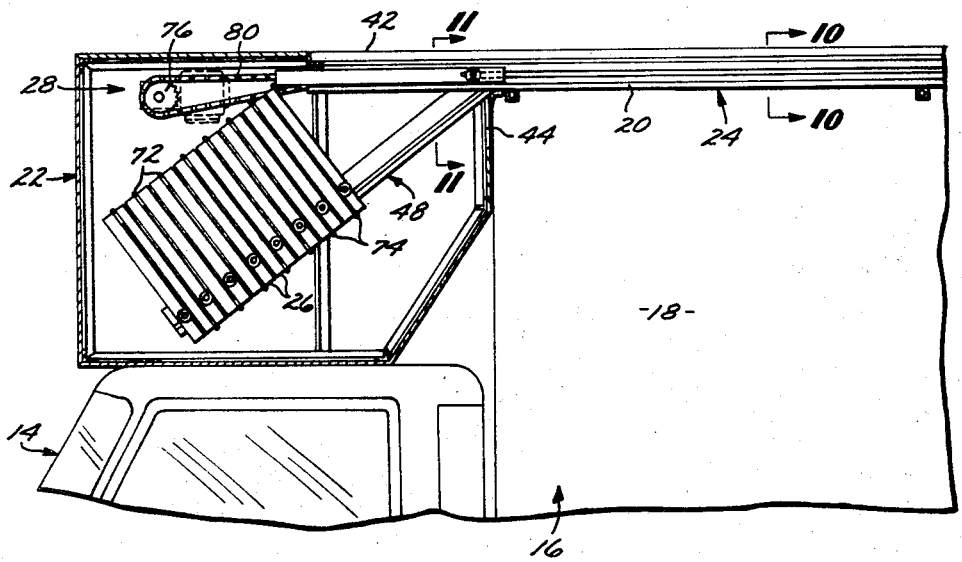
FIGURE 9 is a fragmentary side view, partially in section, of a modified form of the truck converting apparatus designed to allow the rearmost panel to close the open top of the box housing the panels when in a retracted position, the truck converting apparatus being in a retracted position with the rearmost panel closing he open top of the box.

In the drawings, the truck body covering apparatus is represented generally by the numeral 10 and is shown in combination with a truck 12 having a closed cab 14 and an open body 16 including parallel right and left side walls 18 and an open top 20. Such a combination is by way of illustration only, however, since the apparatus 10 may be employed by trucks of various sizes, shapes, and types such as open stake trucks, truck-trailer combinations, and open panel trucks.

Generally speaking, the apparatus 10 includes a box-shaped housing 22 for attachment at or to the forward end of the truck body 12. In the illustrated form, the housing 22 is connected to and supported on top of the cab 14 immediately forward of the front of the body 12. Alternatively, in a truck-trailer combination, the housing may be supported at the front of the body behind the cab, or in the body in certain other truck and truck-trailer combinations.

In addition to the housing 22, the apparatus 10 includes horizontal right and left side track members 24 and a plurality of pairs of panels 26. The tracks 24 are connected to the right and left side walls 18 of the body 12 and extend along the tops thereof. The panels 26 extend the width of the body 12 and are hinged together to fold much like an accordian between a flat or extended position over the top of the body, and a folded or retracted position within the housing 22. Motor drive means 28 stationed within the housing 22 and connected to the rearmost pair of panels 26 provides means for rapidly and selectively moving the panels between the folded and extended positions.

More particularly, and as most clearly illustrated in FIGURES 1 and 2, the housing 22 comprises a flat base 30 for resting on top of the cab 14. A vertical lower front wall 32 extends upwardly from the front end of the base 30 and connects to a rearwardly inclined upper front wall 34. A lower rear wall 36 extends upwardly and rearwardly from the back of the base 30 to a front wall 37 of the truck body 12 and connects to an upper rear wall 38 which extends upwardly along the front wall 37 to a point just below the top of the truck body 12. The front and rear walls of the housing 22 are connected to similar right and left side walls 40 to define an open top 42 and an open upper rear portion 44 for the housing.

The open top 42 of the housing 22 may be closed by a door 46. The door 46 is hinged to the rear end of the upper front wall 34 and is adapted to swing upwardly to expose the open top 42 and to allow entry and exit of the panels 26, as illustrated in FIGURE 2.

The open upper rear portion 44 of the housing 22 is adapted to receive the upper and rearmost end of a pair of downwardly inclined track members 48. The track members 48 are connected to the right and left side walls 40 of the housing 22, extend therealong at about a 45° angle to the horizontal, and generally speaking are adapted to guide the panels 26 as they fold and move into the housing and as they are unfolded and move out of the housing. In this regard, the tracks 48 are identical in structure to the right and left horizontal tracks 24 and the upper end of the tracks 48 are aligned with and abut the forward ends of the tracks 24 to provide a continuous guide for the panels 26 as they move between their folded and extended positions.

More particularly, and as illustrated most clearly in FIGURE 3 for the left-hand horizontal track member 24, the track members 24 and 48 comprise welded, or otherwise connected, lengths of metal forming horizontally communicating inner and outer channels 50 and 52. Immediately below the outer chanel 52 is an elongated compartment 54. In the case of the horizontal track members 24, the track members are bolted, or otherwise secured, to flanged tops 55 of the side walls 18 of the truck body 12. Alternatively, when the truck is a stake body truck, the track members 24 may be attached to the stakes. Also, rather than being attached to the top of the side walls, the track members may be attached to the inside of the side walls by suitable mounting brackets.

As illustrated most clearly in FIGURE 3, the inner wall of the channel 50 is open and is adapted to receive the shafts and rollers of left side guide roller assemblies 56. Separate guide roller assemblies, such as 56, extend from the right and left side of the forward panel 26a of each pair 26 and are located just to the rear of the hinge connection for the forward panel 26a to the rearward panel 26b of the immediately forward pair of panels.

The structural arrangement of one of the left side guide roller assemblies 26 is illustrated most clearly in FIGURES 3 and 7 as comprising a socket 58 in the left side wall of the panel 26a for receiving a horizontal shaft 60. The shaft 60 extends through a sleeve bearing 62 in the open end of the socket 58 and within the socket carries a guide block 64 for sliding along the inner surfaces of the socket as the shaft moves axially therealong. Outside the socket, the shaft 60 carries a guide roller 68 for rolling along the inner channel 50 of the associated track member. A coil spring 70 extends around the shaft 60 within the socket with one end bearing against the sleeve bearing and the other end against the guide block 64 to continuously urge the shaft 60 axially into the socket 58.

Thus arranged, the guide roller 68 is adapted to roll along the inner channel 50 to guide the associated panel 26a therealong as it moves between the folded and extended positions. At the same time, the guide roller 68 and shaft 60 are adapted to move axially to follow any irregularities in the track members or in the side walls of the truck body 12 or housing 22.

As previously indicated, the pairs of panels 26 extend the width of the truck body 12 and are hinged together to fold much like an accordian. The structure of the panels 26 is most clearly illustrated in FIGURES 5 and 6. As represented, the panels 26 are formed from upper and lower sheet metal members folded at their marginal edges and welded or otherwise secured together to form hollow, substantially rectangular panels having reinforced marginal edges. The hollow panels 26 may be filled with an insulating material if desired.

The hinge arrangements for the panels 26 are particularly important features of the present invention in that they allow the panels to be rapidly and simply moved between a compact folded position and a flat extended position. In this regard, the rear and front edge portions of the panels 26a and 26b of each pair of panels, are connected by a hinge 72. The hinge 72 preferably is connected to the bottom surfaces of the panels 26 and permits the panels 26a and 26b to fold from a flat horizontal position downwardly relative to the hinge 72 and inwardly toward each other. In addition to the hinges 72, the rear and front portions of the panels 26b and 26a and adjacent pairs of panels 26 are connected by a hinge 74. The hinge 74 preferably is connected to the top surfaces of the adjacent rear and front panels and permits the panels 26b and 26a to fold from a flat horizontal position upwardly relative to the hinge 74 and inwardly toward each other.

Due to the arrangement of the hinges 72 and 74, when the panels are in the extended position, they lie completely flat in a horizontal plane to cover the open top of the truck body 12. On the other hand, when the panels are in the retracted position they are folded tightly against each other in a compact package in the housing 22.

When it is desired to move the panels 26 from the extended position to the folded position, the panels are moved to the left as illustrated in FIGURES 1 and 2. As this occurs, the rollers 68 connected to the panels 26a of each pair 26 roll along the tracks 24. As the forwardmost panel 26a moves into the housing 22, its associated rollers 68 roll down the inclined track members 48 and as indicated in phantom outline in FIGURE 1, the panels 26a and 26b in the first pair 26 fold downwardly relative to the hinge 72 and inwardly toward each other. As the panel 26a of the second pair 26 enters the housing 22, its associated rollers 68 roll down the inclined track members 48 and the panels 26b and 26a of the first and second pairs fold upwardly relative to the hinge 74 and inwardly toward each other. This process continues as the panels are moved from the extended position into the folded position within the housing 22, as illustrated in FIGURE 2. Since the hinges 72 permit the panels to fold above the track 48, they easily clear the front wall 37 of the truck body 12 in entering the housing 22 through its open top, which, when the panels are within the housing, is covered by the door 46. The door 46 may also be closed when the panels are in the extended position to cover the open top of the housing 22.

When it is desired to again cover the open top of the truck body 12, the foregoing operation is simply reversed and the pairs of panels 26 are drawn one at a time, beginning with the rearmost pair, upwardly from the housing 22 and to the right along the tracks 24. During this operation, the panels unfold above the track members 24 and 48 (see FIGURE 2) and move easily through the open top of the housing 22 above the front wall 37.

Because the hinges 72 and 74 permit an accordian-like folding and unfolding of the panels 26, the panels are more easily moved with greater safety and at high speed between the folded and extended positions than in prior truck body converting apparatus. Furthermore, because of the hinge arrangements, a less powerful drive mechanism may be employed to move the panels between the extended and folded positions.

The motor drive mechanism 28 for moving the panels between the folded and extended positions is best illustrated in FIGURE 1 as comprising sprockets 76 and 78, endless drive chains 80 and a motor drive (not shown). A sprocket 76 is mounted at the forward end of each track member 48 in line with the outer channel 52 thereof and a sprocket 78 mounted at the rearward end of each channel 24 in line with the outer channel thereof. The sprockets 76 at the ends of the channels 48 may be mounted for turning on a common shaft as may the sprockets 78 at the end of the channel 24. The sprockets 76 are drive sprockets and are connected by their common shaft to the motor drive located within the housing 22. The endless drive chains 80 extend around the sprocket 76 and through the aligned track members 48 and 24 and around the corresponding sprockets 78 at the rear end of the track members 24. In this regard, and as most clearly illustrated in FIGURES 3, 4 and 8, the drive chains 80 extend from the top of the drive sprocket 76 along the outer channels 52 in the track members 48 and 24 around the driven sprockets 78 and back to the drive sprockets through the elongated compartments 54.

To drive the series of panels 26, the drive chains 80 are connected to right and left side guide roller assemblies 82 for the panel 26b in the rearmost pair of panels 26, immediately adjacent the rear end thereof.

The guide roller assemblies 82 are very similar to the previously described guide roller assemblies 56 and as illustrated most clearly in FIGURES 4 and 8 each include a shaft 84 extending axially from a socket 86 in the side of the rearmost panel 26b. The shaft 84 is supported in the manner shown in FIGURE 7 for the shaft 60 and extends outward through the open side of the inner channel 50 and into the outer channel where it carries a relatively thin guide roller 88. Beyond the guide roller 88, the shaft 84 is of reduced diameter and adapted to fit through a central opening in a connecting link 90. Washers 92 and 94 are located on opposite sides of the link 90 and the link is secured on the end of the shaft by a nut 96. Forward and rearward ends of the link 90 are connected to the associated drive chain 80.

Accordingly, longitudinal driving movement imparted to the drive chains 80 by the driving sprockets 76 and associated motor drive is transferred to the rearmost panel 26b and through the hinge connections to the remaining panels 26. Thus, when the panels are in the folded position within the housing 22, a clockwise turning of the driving sprocket 76 (when viewed in FIGURE 1) causes the driving chains 80 to pull rearward on the right and left sides of the rearmost panel 26b and to draw the rearmost panel upwardly out of the housing 22. As the rearmost panel moves upwardly and out of the housing 22, it pulls on the adjacent panel to cause the adjacent panel to unfold and move upwardly out of the housing. This process is repeated in succession and the panels are successively unfolded and drawn from the retracted to the extended position over the top of the truck body 12.

During the unfolding operation, the driving sprockets 78 continue to turn in a clockwise direction and the driving chains continue to move rearwardly in the outer channels 50 and forward in the lower compartments 54.

When it is desired to return the panels 26 to the housing 22 and to the folded position, the driving sprockets 76 are turned in a counterclockwise direction to cause the driving chains 80 to move forward in the outer channel 52 and rearward in the lowered compartments 54. As this occurs, the rearmost panel 26b is pushed forward and exerts a like force on all the panels 26 in the series. As the forwardmost panel 26a moves into the housing 22, the folding operation commences in the manner previously described and the panels fold in pairs into the housing as illustrated in FIGURE 2.

When the panels are completely within the housing, the door 46 is closed to cover the housing and to prevent the entry of water and other foreign matter into the housing. The door performs a similar sealing function when the panels 26 are in the extended position illustrated in FIGURE 1. In this regard, the door includes a sealing strip 97 along its rear marginal edge for bearing upon the top of the forwardmost panel 26a.

Similar sealing functions are provided along the right and left marginal edges of the panels 26a and 26b by longitudinally disposed cover members 98. As illustrated most clearly in FIGURES 3 and 4, the cover member 98 are pivotally connected at 100 to the top of the channel members 24 and curve over the upper side edges of the panels when in the flat extended position. Inner longitudinal edges of the cover members have rubber sealing strips 102 which bear upon the top of the panels to provide a watertight seal therebetween. Also, continuous, split rubber seals 104 extend over the open inner sides of the channels 50 to tightly receive the shafts 60 and 84 as the panels move along the track members 24 to prevent foreign matter from entering the track members.

In the form of the apparatus 10 illustrated in FIGURES 1 and 2, the housing 22 includes an open top which is adapted to be covered by the door 46. In the embodiment illustrated in FIGURES 9, 10 and 11, a modified form of housing 22 is employed wherein the rearmost panel 26b functions as a door for covering the open top of the housing when the panels are in their folded position. External to the housing 22, the balance of the apparatus 10 is as previously described. Therefore, the discussion of the alternate embodiment will be limited to the structural differences contained within the housing 22 which permits the rearmost panel 26b to act as a door for the housing.

Figure 11:
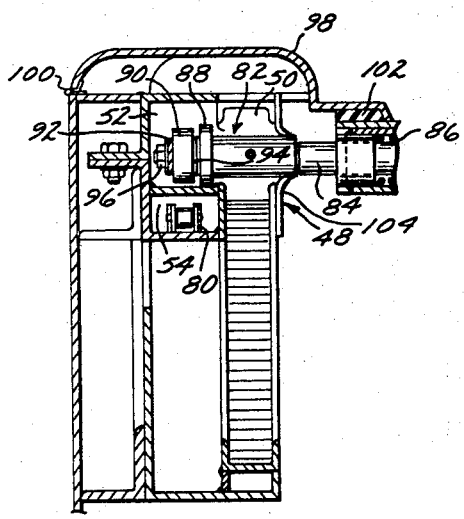
FIGURE 11 is a fragmentary sectional view taken along the line 11—11 in FIGURE 9 illustrating the inner construction of the tracks within the box in the modified form of my invention.
Figure 10:
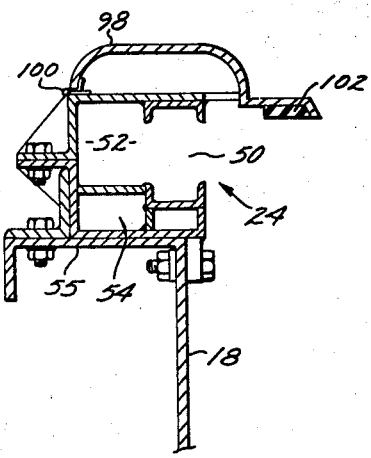
FIGURE 10 is a fragmentary sectional view taken along the line 10—10 in FIGURE 9 illustrating the construction of one of the tracks in the modified form of the truck converting apparatus.

The primary differences within the housing 22 illustrated in FIGURES 9, 10 and 11 reside in the arrangement of the track members 48 and the positioning of the motor drive apparatus 28. As illustrated most clearly in FIGURE 11, the track members 48 are modified such that the inner channels 50 are inclined downwardly as in FIGURES 1 and 2. The outer channels 52 and lower compartments 54, however, continue in a horizontal plane in line with the outer channels and lower compartments in the track members 24.

The motor drive apparatus 28 is located at the forward end of the outer channel 52 and again includes the driving sprockets 76 for driving the drive chains 80. As before, the drive chains 80 extend along the outer channels 52 and the lower compartments 54 to connect to the rearmost panel 26b. Since only the rearmost panel 26b is connected to the driving chains 80 and includes guide rollers for riding along the outer channels 52, and since the balance of the panels 26 include rollers for riding in the inner channels 50, as the panels move from the extended to the retracted positions, they fold in the manner previously described and travel downwardly along the inclined inner channels 50 of the track members 48 as illustrated in FIGURE 9. The rearmost panel 26b, however, is guided by its guide roller assembly 82 along the outer channels 52 of the track members 48 to continue in a horizontal plane is illustrated in FIGURE 9. Thus, as represented, the rearmost panel 26b lies in a horizontal plane when the panels are in the folded position and covers the open top of the housing 22 to prevent the entry of water and other debris into the housing.

From the foregoing, it is appreciated that the present invention provides an improved apparatus for automatically covering the open body of a truck to convert the truck to a covered van. Furthermore, the apparatus is easily attached to used trucks simply by mounting the housing in a suitable location, and by attaching the track members 24 along the sides of the existing truck body. Once the housing and tracks are mounted, and once the driving chains 80 are in place, the apparatus is ready for operation to convert the open body truck to a covered van.

Moreover, the same apparatus 10 may be employed on different trucks simply by removing the apparatus from one truck and attaching it to another. Usually, this may be accomplished with only minor adjustments being required in the apparatus 10.

From the foregoing, it is also appreciated that the present invention provides apparatus for covering the open top of a truck which is more efficient faster and safer in operation than prior truck converting devices.

Although particular forms of truck body covering apparatus have been described in some detail herein, changes and modifications may be made in the illustrated forms without departing from the spirit of the invention. It is therefore intended that the present invention be limited in scope only by the terms of the following claims.

I claim:

1. Apparatus for attachment to a truck having an open body and operable to cover said body and thereby convert said truck to a covered van, said apparatus comprising:
   a housing for location at the front end of an open truck body, said housing having an open top;
   a pair of downwardly and forwardly inclined track means at opposite sides of said housing;
   a pair of longitudinally extending, substantially horizontal track means for attachment to the opposite sides of said truck body, said horizontal track means forming a rearward extension of said inclined track means;
   a plurality of pairs of first and second panels having substantially parallel front and rear edge portions, said panels being arranged serially and in abutting relation at said edge portions, said panels having extended positions in which said panels overlie and cover said truck body and retracted positions in which said panels fold against one another and within said housing;
   roller means mounted to the opposite sides of said first panels of each pair of said panels, and movable along said inclined track means and said horizontal track means;
   first hinge means connecting the rear and front edge portions of said first and second panels of each said pair of panels, said first hinge means being hingeable to enable folding of said first and second panels in each said pair into said retracted positions with said first hinge means located upwardly of the associated said roller means, thereby facilitating subsequent movement of said panels toward said extended positions;
   second hinge means connecting the rear and front portions of said second and first panels of adjacent pairs of said panels, said second hinge means being hingeable to enable said folding of said panels into said retracted positions;
   and drive means for moving said roller means back and forth along said track means to move said panels between said retracted positions and said extended positions.

2. The apparatus of claim 1 wherein said housing is a box structure having a removable top hinged thereto for covering said open top when said panels are in said retracted positions in said box.

3. The apparatus of claim 1 wherein said first hinge means connect to the bottom of said first and second panels and wherein said second hinge means connect to the top of said second and first panels.

4. The apparatus of claim 1, wherein said drive means includes pulley means at the lower ends of said inclined track means and at the rearmost ends of said horizontal track means, drive belt means connected to the opposite sides of the second panel of the rearmost pair of said panels in said extended positions of said panels, and means for turning said pulley means to move said pairs of panels between said extended positions and said retracted positions.

5. The apparatus of claim 4 wherein said drive means further includes guide rollers located adjacent said connections of said belt means and extending from right and left sides of said second panel of said rearmost pair of panels for riding along said horizontal track means.

6. The apparatus of claim 1 further including means supporting said roller means for axial movement toward and away from said opposite sides of said first panels to accommodate irregularities in the orientation of said horizontal track means.

7. The apparatus of claim 6 wherein said support means comprises a socket in said first panel for each roller means, a shaft supported for sliding movement in said socket, roller means connected to said shaft external of said socket for riding in said track means and spring means continuously urging said shaft into said socket.

8. The apparatus of claim 1 wherein said inclined track means and said horizontal track means each comprise inner and outer channel means, said inner channel means being adapted to receive said roller means and wherein said drive means includes pulley means at the lower ends of said inclined track means and at the rearmost ends of said horizontal track, said pulley means being aligned with said outer channel means, belt drive means connected to the opposite sides of the second panel of said rearmost pair of panels and extending along said outer channel means around said pulley means, and means for turning said pulley means to move said panels between said extended positions and said retracted positions.

9. The apparatus of claim 1 including means supporting said second panel of the pair of panels most remote from said housing to close said open top of said housing when said panels are in said retracted position.

10. The apparatus of claim 1 wherein:
    said third and fourth track means include inner and outer channels, said inner channels being adapted to receive said roller means;
    said first and second track means include channels aligned with said inner channel means of said third and fourth track means and horizontal channel means aligned with said outer channel means of said third and fourth track means;
    said drive means includes pulley means at the forward end of said horizontal channel means and at the rearmost ends of said outer channel means of said third and fourth track means, drive belt means connected to the right and left sides of the second panel of the pair of panels most remote from said housing at a rear end thereof and extending along said outer channel means of said third and fourth track means and said horizontal channel means of said first and second track means around said pulley means, and means for turning said pulley means to move said panels between said retracted and extended positions whereby said second door of said pair of doors most remote from said housing follows said horizontal channel means and closes said open top of said housing when said panels are in said retracted positions.

References Cited

UNITED STATES PATENTS 3,072,432  1/1963  Ohle _____ 296—137

FOREIGN PATENTS 1,003,892  4/1962  Great Britain.

BENJAMIN HERSH, *Primary Examiner.*

ROBERT R. SONG, *Assistant Examiner.*